Feb. 4, 1947.   R. G. LE TOURNEAU   2,415,293
DIFFERENTIAL
Filed Jan. 23, 1945    3 Sheets-Sheet 1

INVENTOR
R. G. LeTourneau
BY
ATTORNEYS

Feb. 4, 1947.   R. G. LE TOURNEAU   2,415,293
DIFFERENTIAL
Filed Jan. 23, 1945   3 Sheets-Sheet 2

INVENTOR
R. G. LeTourneau
BY
ATTORNEYS

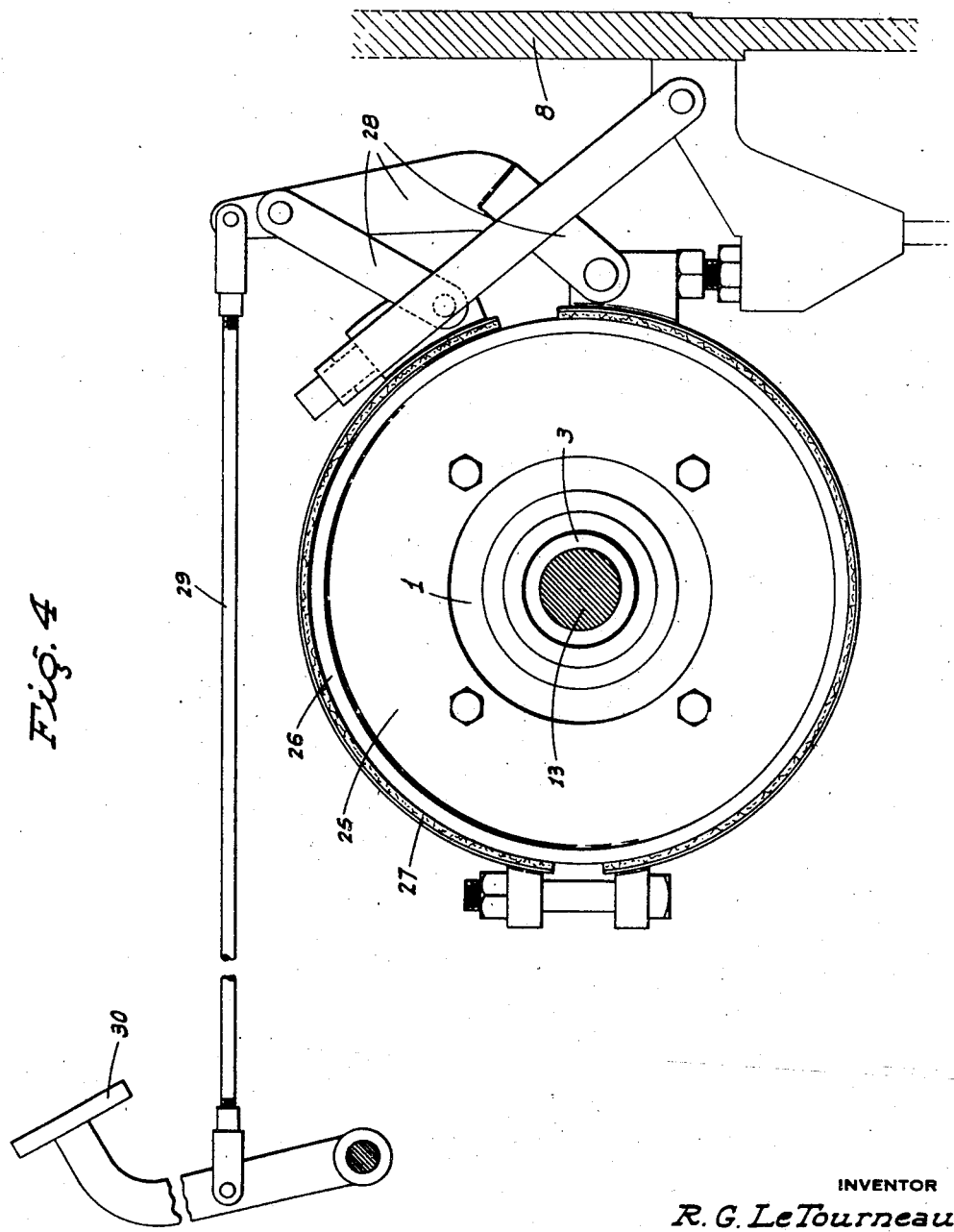

Patented Feb. 4, 1947

2,415,293

UNITED STATES PATENT OFFICE 2,415,293

DIFFERENTIAL

Robert G. Le Tourneau, Peoria, Ill., assignor to R. G. Le Tourneau, Inc., Stockton, Calif., a corporation of California Application January 23, 1945, Serial No. 574,050

6 Claims. (Cl. 74—315)

The present invention relates to, and it is an object to provide, an improved differential for motor vehicles.

Another object of the invention is to provide a differential constructed so as to minimize slipping or spinning of one of the vehicle drive wheels relative to the other; such result being accomplished through the medium of a novel friction drag assembly arranged in connection with the differential pinions and cooperating between the latter and the differential cage.

A further object of the invention is to provide a vehicle differential, as in the preceding paragraph, in which said friction drag assembly comprises a circular, rotary head to which each differential pinion is axially but relatively non-rotatably secured, and a friction collar corresponding to and in which each head engages in relatively rotatable but friction-drag relation, said collars being fixed on the differential cage.

An additional object of the invention is to provide a vehicle differential and brake in novel combination.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 4 is a fragmentary end elevation of the brake unit.

Figure 1:
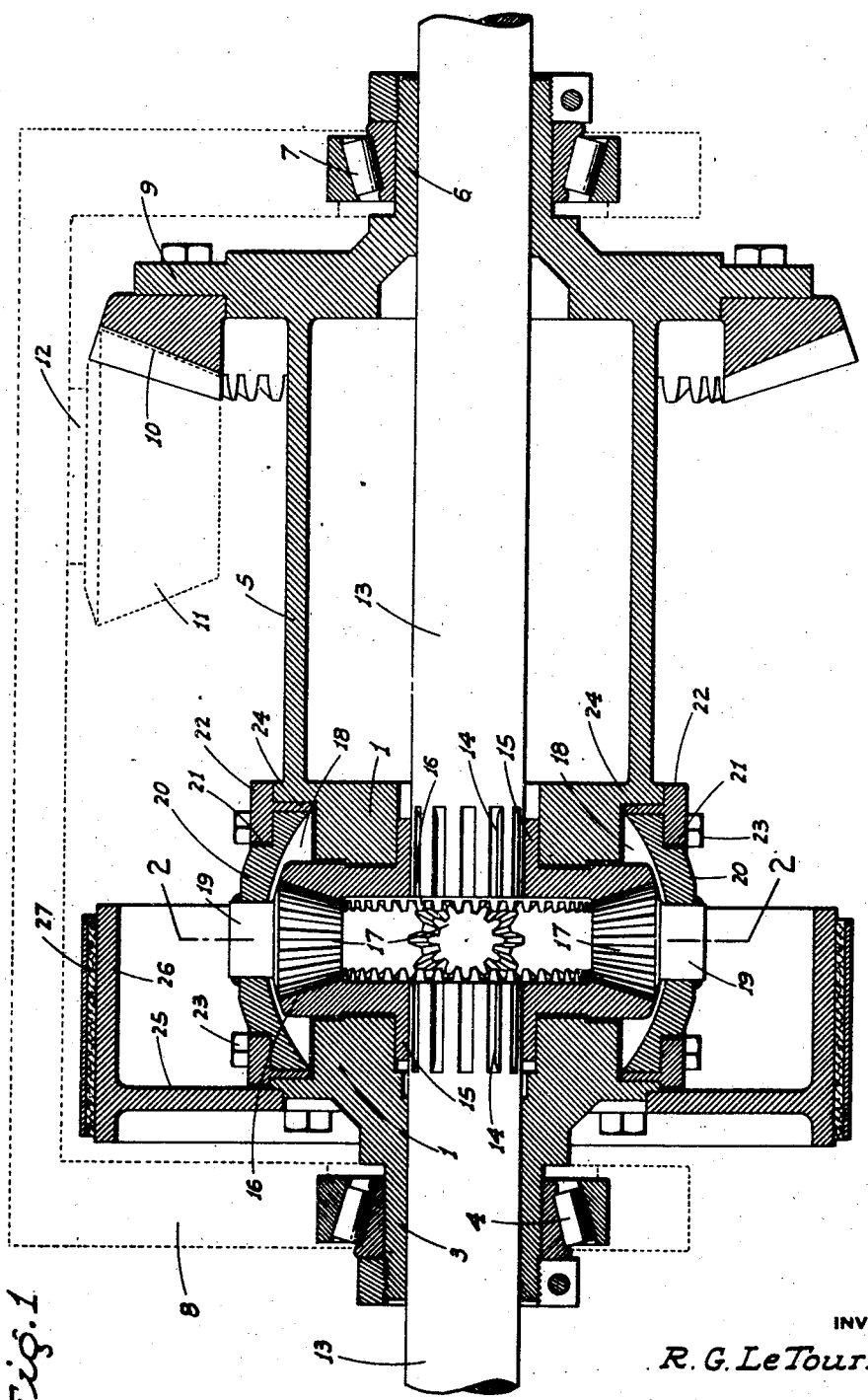
Figure 1 is a sectional elevation of the differential.
Figure 2:
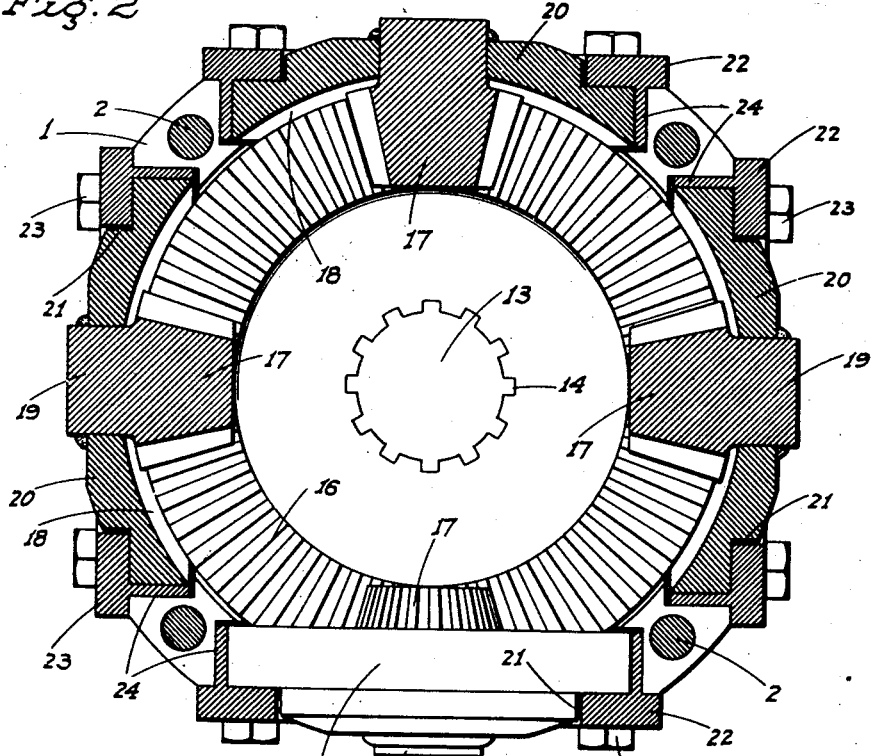
Figure 2 is a transverse section on line 2—2 of Fig. 1.
Figure 3:
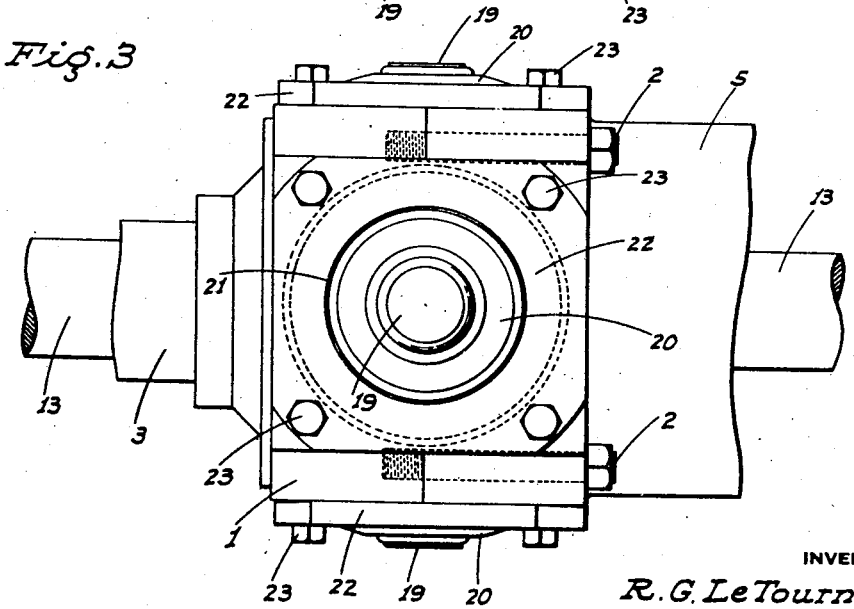
Figure 3 is a fragmentary longitudinal view with the brake unit removed.

Referring now more particularly to the characters of reference on the drawings, the differential comprises a rotary cage, indicated generally at 1, which cage is of two-piece construction, split centrally, and normally held in unitary relation by means of bolts 2. At one end the cage 1 includes a trunnion 3 supported in an adjustable combination annular and thrust bearing 4. At the opposite end the cage is formed with an integral drive sleeve 5 of substantial diameter and length; said drive being formed at its outer end with a trunnion 6 supported in an adjustable combination annular and thrust bearing 7. The bearings 4 and 7 are supported by opposite ends of the differential housing, which is indicated diagrammatically in dotted lines at 8. Adjacent the trunnion 6 the drive sleeve 5 is formed with a radial flange 9 to which is attached a bevel ring gear 10, the latter meshing with a driven bevel pinion 11 fixed on the rear end of the vehicle drive shaft 12 which projects through the differential housing 8; the pinion 11 and shaft 12 being indicated diagrammatically by dotted lines.

The rear axles of the vehicle are indicated at 13 and project into the differential through the trunnions 3 and 6, said axles terminating at their inner ends within the cage 1 in adjacent but spaced relation.

The inner ends of axles 13 are splined, as at 14, into the hub 15 of bevel, differential gears 16 journaled in the cage in spaced but matching face to face relation.

The bevel gears 16 run in mesh with and are interconnected by four bevel, differential pinions 17 equally spaced apart; each pinion corresponding to and being centered relative to one side of the cage, which cage is four-sided. At each side the cage is formed with a circular recess 18 concentric to the corresponding differential pinion 17.

The pinions 17 are each formed with an axial, outwardly projecting hub 19 to which is fixed a circular rotary head 20; each head 20 being generally concavo-convexo with the concave side innermost, whereby the peripheral portion of said head extends some distance into the corresponding circular recess 18.

Each head is formed on the outside and adjacent the periphery with an annular, concentric groove 21 of right-angle shape in cross section. A collar 22, having a circular bore, is fixed on each side of the cage 1 by means of bolts 23 and rides in the groove 21 of the adjacent head 20. Each collar 22 also includes an annular, inwardly projecting flange 24 disposed some distance radially out from the bore of the collar 22 and concentric to the corresponding head 20; said flange riding in frictional engagement with the periphery of said head. With this arrangement, adjacent heads 20 and collars 22, frictionally engage both at the bottom of grooves 21 and at the periphery of said heads; such engagement producing a substantial friction drag between said parts upon relative rotation therebetween.

The above described differential normally functions in a conventional manner. However, when one of the drive wheels of the vehicle rides on a surface which tends to permit said wheel to slip and spin, such tendency to spin is minimized to a substantial extent by reason of the friction drag assembly arranged in connection with the differential pinions and cooperating between the latter and the cage; such friction drag assembly comprising the circular rotary heads 20 frictionally engaged by the collars 22 and flanges 24. The friction drag between such parts is such that when one of the axles 13 tends to rotate faster than the other, a compensating resistance to such relative differences in axle speed is produced, which tends to prevent any relatively great difference in speed between the driving wheels of the vehicle.

The differential also incorporates therein a brake structure, as follows:

A radial flange 25 is fixed in connection with the cage 1 at one end thereof and at its periphery said flange carries a brake drum 26 which overhangs the cage.

A lined brake band unit 27 surrounds and co-operates with the drum 26, said brake band unit being normally released but adapted to be set by means of an actuating linkage, indicated generally at 28, connected between said brake band unit and the differential housing 8. The actuating linkage 28 is controlled from the operator's compartment of the vehicle through the medium of a pull link 29 and a foot pedal 30. Upon depression of the foot pedal 30 the actuating linkage 28 sets the brake band unit 27, braking the drum 26. As the drum 26 is fixed in connection with the cage 1, braking of said drum likewise brakes the cage 1, which in turn produces a braking action on both of the shafts 13 and the vehicle wheels.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A differential including a driven cage, differential gears in the cage, a differential pinion in mesh between said gears, and means arranged to frictionally resist differential rotation of said gears; said means being a circular head fixed in connection and rotatable with the differential pinion, and a collar surrounding and frictionally engaging said head, said head and collar having a pair of adjacent but angularly disposed co-operating annular surfaces.

2. A differential as in claim 1 in which said pair of co-operating annular surfaces are disposed at a right angle to each other.

3. A differential including a driven cage, differential gears in the cage, a differential pinion in mesh between said gears, a circular head on the pinion, said head being supported for rotation within the cage wall and constituting the support and bearing for the pinion, and means to frictionally resist rotation of the head.

4. A differential including a driven cage, differential gears in the cage, a differential pinion in mesh between said gears, a circular head on the pinion, said head being supported for rotation within the cage wall and constituting the support and bearing for the pinion, and an element projected into the cage wall about said head and frictionally engaging the head whereby to resist rotation thereof.

5. A differential including a driven cage, differential gears in the cage, a differential pinion in mesh between said gears, the cage wall being provided with a recess which is substantially concentric with said pinion, a circular head fixed to the pinion and rotatably mounted in said recess and forming the support and bearing for the pinion, a collar fixed to the outer edge of the recess and overhanging and frictionally engaging a portion of the top of the head whereby to resist rotation of such head.

6. A differential including a driven cage, differential gears in the cage, a differential pinion in mesh between said gears, the cage wall being provided with a recess which is substantially concentric with said pinion, a circular head fixed to the pinion and rotatably mounted in said recess and forming the support and bearing for the pinion, a collar fixed to the outer edge of the recess and overhanging and frictionally engaging a portion of the top of the head whereby to resist rotation of such head, and an annular inturned flange on the collar projecting into the recess and frictionally engaging the outer edge of the head to further resist the rotation thereof.

ROBERT G. LE TOURNEAU.

REFERENCES CITED

The following references are of record in the file of this patent:

UNITED STATES PATENTS

| Number | Name | Date |
|---|---|---|
| 1,315,236 | Parker | Sept. 9, 1919 |
| 1,316,057 | Parker | Sept. 16, 1919 |
| 2,064,152 | Conboy | Dec. 16, 1936 |
| 2,354,214 | Lockwood | July 25, 1944 |